Jan. 14, 1969   J. W. BERGSTROM ET AL   3,422,173
METHOD OF FABRICATING FERRITE BODIES
Filed Nov. 15, 1965
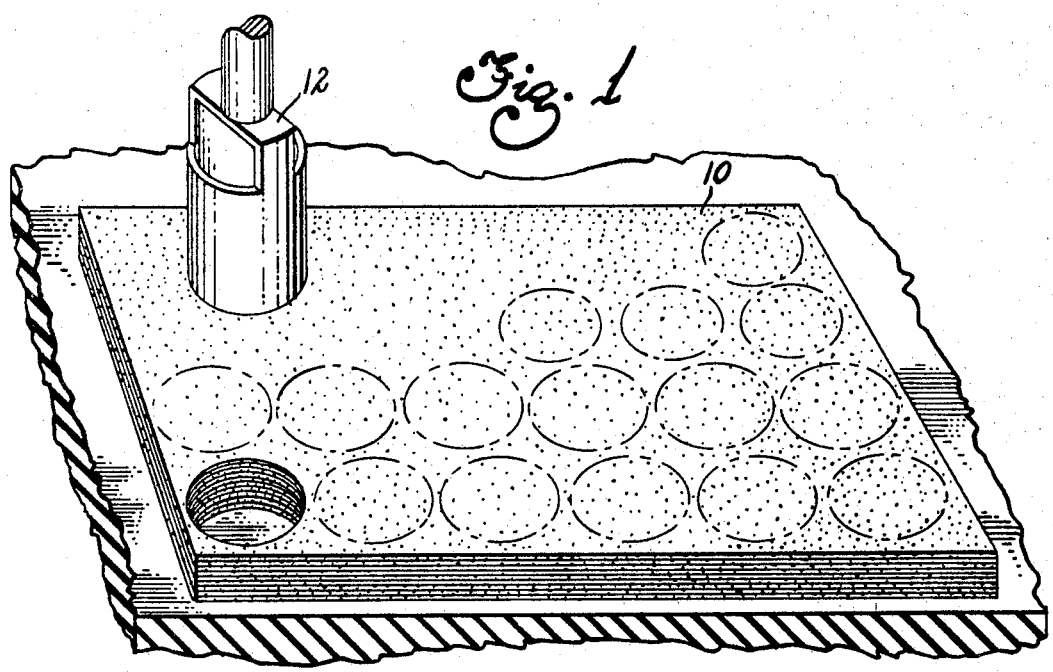
Fig. 1
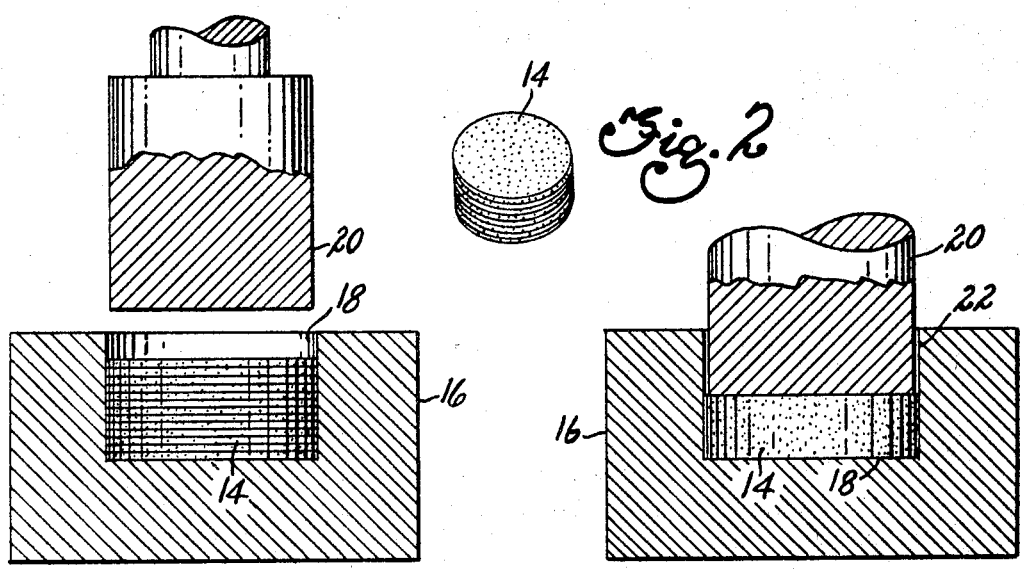
Fig. 2
Fig. 3
Fig. 4
INVENTORS
JAMES W. BERGSTROM
GLENN E. SUTHERLAND
BY
ATTORNEY

United States Patent Office 3,422,173
Patented Jan. 14, 1969

3,422,173
METHOD OF FABRICATING FERRITE BODIES
James W. Bergstrom, Troy, and Glenn E. Sutherland, Roseville, Mich., assignors to General Motors Corporation, Detroit, Mich., a corporation of Delaware
Filed Nov. 15, 1965, Ser. No. 507,777
U.S. Cl. 264—59          4 Claims
Int. Cl. C04b 35/26

ABSTRACT OF THE DISCLOSURE

A method of fabricating oriented hard ferrite bodies is disclosed. The ferrite crystals are mixed with a deformable wax binder to form a mixture which is rolled between rolls having different speeds to produce wax sheets containing oriented ferrite crystals therein. These sheets are then stacked to form a laminae stack of the desired thickness. Raw bodies of the desired shape are then cut from the laminae stack. The raw bodies are compacted in a heated die assembly to expel a major portion of the wax binder. The resultant raw bodies are prefired to remove the remaining portion of the wax binder and subsequently sintered at elevated temperatures to form a finished sintered oriented hard ferrite body.

---

This invention relates to oriented hard ferrite bodies, and particularly to a method of fabricating oriented hard ferrite bodies.

The present invention constitutes an improvement in the process disclosed in Brailowsky Patent No. 3,110,675 wherein a method of making oriented hard ferrite bodies is disclosed including the steps of calcining a mixture of iron oxide and one or more bivalent metal oxides selected from the group consisting of barium, strontium and lead to produce a ferrite, pulverizing the ferrite, mixing it with a rubber binder, mechanically orienting the ferrite crystals on a rubber mill, forming ferrite bodies in the desired shape, prefiring the bodies to remove the rubber binder, and finally sintering the ferrite bodies. In the present invention a wax binder is used which has been found to be more compatible with the process. This wax binder is capable of being rolled, sheeted, laminated, and burned out to produce sound, compact sintered ferrite bodies. By using a wax binder as disclosed herein parts of the desired thickness can be made out of a laminae stack such that during the prefiring the binder will be eliminated without leaving cracks or separating the laminations.

Accordingly, among our objects are the provision of an improved method of fabricating relatively thick ferrite bodies, the further provision of an improved inexpensive method for manufacturing ferrite bodies from a laminae stack; the further provision of an improved method of fabricating oriented hard ferrite bodies of uniform density; and the still further object of an improved oriented hard ferrite body made by the aforesaid methods.

The aforementioned and other objects are accomplished in the present invention by mixing the ferrite crystals with a wax binder on a rubber mill comprising a pair of rolls which are driven in opposite directions at slightly different speeds so as to produce a shearing action on the material and thus mechanically orient the hexagonal platelet-shaped ferrite crystals to produce a material with anisotropic magnetic characteristics. Preferably the sheets are rolled to a thickness of .010 inch. Thereafter, the sheets are arranged in a laminae stack to form the desired thickness of the bodies, the bodies are punched therefrom and placed in a heated die. A major portion of the wax binder is expelled from the bodies during compaction in the die, and thereafter the bodies are prefired to remove the remaining wax binder and finally sintered to form the finished oriented hard ferrite bodies.

Further objects and advantages of the present invention will be apparent from the following description, reference being had to the accompanying drawing, wherein a preferred embodiment of the present invention is clearly shown.

In the drawing:

FIGURE 1 is a perspective view of a laminae stack from which the ferrite bodies are punched.

FIGURE 2 is a perspective view of an exemplary disc body which is punched from the laminae stack of FIGURE 1.

FIGURE 3 is a view, partly in section and partly in elevation, of the die assembly for compacting the laminated bodies and expelling a portion of the wax binder therefrom.

FIGURE 4 is a view similar to FIGURE 3 showing the bodies in the die assembly after compaction.

In accordance with the improved method of fabricating oriented hard ferrite bodies, the metal oxide reagents are weighed, and intimately mixed as a wet slurry. This can be accomplished by mixing the basic metal oxides with distilled water, placing the mixture in a ball mill and operating the ball mill for an adequate time period to assure thorough mixing. The wet mixture of basic metal oxides is then heated in air to remove the moisture. The dried powder mixture is thereafter sifted with a 20 to 30 mesh screen to remove the stainless steel balls from the ball milling operation.

The sifted powder mixture of basic metal oxides is then placed in saggers which are covered and stacked in a furnace where they are heated at an elevated temperature for a certain length of time, the time and temperature being determined by the particular metal oxides used. This step is known as calcining and its purpose is to react the ferric oxide with one or more of the bivalent metal oxides selected from the group consisting of barium, strontium and lead.

The calcined ferrite then is ground as a wet slurry by adding distilled water. The ferrite crystals are ground in a ball mill in order to reduce the particle size to about 3 to 5 microns, after which the material is again dried and sifted. Thereafter, the ferrite crystal powder is mixed with a wax binder on a rubber mill. The rolls of this rubber mill are maintained at a temperature between 80 and 95° F. to soften the wax so as to make it more receptive to the ferrite crystal powder. The ferrite crystal powder and wax are mixed in a ratio of about 87% powder to 13% wax binder by weight. During the mixing step the rolls of the rubber mill are spaced apart about .020 inch.

After milling the sheeted material is removed from the rubber mill and the space between the rolls is reduced to .010 inch. The rolls are driven in opposite directions at slightly different speeds so as to produce a shearing action on the sheet material and thus mechanically orient the hexagonal platelet-shaped ferrite crystals to produce a material with anisotropic magnetic characteristics. The material is passed through the rolls until substantially all of the hexagonal ferrite crystals are oriented and the surface of the sheets are smooth so as to be free of air pockets and cracks.

The rolled sheets are then formed into a laminae stack on a hard rubber surface. The number of layers in the laminae stack, of course, determines the thickness of the ferrite bodies and by following the present method it is possible to obtain a stack thickness up to one-half inch, i.e., fifty sheets. A typical laminae stack 10 is indicated in FIGURE 1 of the drawings. The raw ferrite bodies are formed by using a suitably shaped punch 12, and the remaining portion of the laminae stack after the bodies are punched therefrom is returned to the rubber mill and sheeted again. By using a wax binder of the type more particularly hereinafter defined, the sheets in the laminae stack will stick together and the bodies will not delaminate. After the bodies are punched from the laminae stack, the bodies are placed in heated die assemblies which are maintained at a temperature of about 310° F.

Referring to FIGURES 2 through 4, the raw ferrite bodies punched from the laminae stack of FIGURE 1 are in the form of discs 14. However, this shape of body is only exemplary and it is readily apparent that various shapes of bodies, such as toroids, arcuate segments, etc., can be punched from the laminae stack. The die assemblies comprise a die body 16 having a cavity 18 suitably shaped to receive the ferrite body 14 and a cooperating die plug 20. The diameter of the die plug is slightly less than the die cavity 18 such that when the plug is inserted into the cavity 18 and placed under pressure, a major portion of the wax binder will be expelled from the die cavity in the annular space 22 between the die plug 20 and the die body 16 as seen in FIGURE 4.

As alluded to hereinbefore, the raw ferrite-wax binder bodies are composed of 87% ferrite crystals and 13% wax binder when placed in the die assembly. Initially, light pressure from 200 to 500 p.s.i. is exerted between the die body 16 and the die plug 20 for from five to ten minutes thus allowing the bodies to heat up to 310° F., which is the die asembly temperature. At this tempertaure the wax binder becomes molten and as the pressure is increased uniformly to 10,000 p.s.i., over a period of four minutes approximately 60 to 70% of the wax binder is expelled. A pressure of 10,000 p.s.i. is maintained for approximately one to one and one-half minutes after which it is released and the die assembly is cooled in water.

After compaction in the die, the bodies 14 are again placed in saggers and the saggers are placed in a furnace to prefire the same and thus burn out the remaining portion of the wax binder. With the wax binder as disclosed in this invention, complete burn out of the wax binder can be achieved at a temperature of about 600° F. Thereafter, the furnace temperature is increased to sinter the ferrite bodies at an elevated temperature for a certain length of time, the time and temperature again being determined by the basic metal oxides that are used. After sintering, the ferrite bodies are cooled to room temperature and subsequently they can be magnetized by direct current pulse magnetization.

The following examples of wax binders have been found to be suitable in the present method of fabricating oriented hard ferrite bodies.

EXAMPLE 1

| | Percent by weight |
|---|---|
| Ozokerite [1] | 78.5 |
| Petrolatum (softener) | 4.9 |
| Polyisobutylene (adhesive) | 16.6 |

EXAMPLE 2

| | |
|---|---|
| Ozokerite [1] | 42 |
| Paraffin | 42 |
| Petrolatum | 5.5 |
| Polyisobutylene | 10.5 |

EXAMPLE 3

| | |
|---|---|
| Ozokerite [1] | 68.7 |
| Paraffin | 19.4 |
| Petrolatum | 3.1 |
| Amorphous polypropylene | 8.8 |

EXAMPLE 4

| | Percent by weight |
|---|---|
| Ozokerite [1] | 46.8 |
| Paraffin | 37.8 |
| Mineral spirits | 4.8 |
| Amorphous polypropylene | 10.6 |

[1] Ozokerite is a mineral wax or native paraffin comprising a mixture of hydrocarbons that are soluble in carbon disulfide.

Animal wax, such as beeswax, was found to be unsuitable since it does not expel from the die assembly during compaction.

From the foregoing examples it is apparent that successful wax binders normally include a wax content in the range between 78.5% by weight and 88.1% by weight, a softener content of from 3.1 to 5.5% by weight and an adhesive content of between 8.8 and 16.6% by weight. The preferred formulation of the wax binder comprises 85% by weight of wax, 4% by weight softener and 11% by weight of an adhesive.

While the embodiment of the invention as herein disclosed constitutes a preferred form, it is to be understood that other forms might be adopted.

What is claimed is as follows:

1. A method of fabricating oriented hard ferrite bodies comprising the steps of mixing ferrite crystals with a deformable wax binder, rolling said mixture of deformable wax binder and ferrite crystals into flat sheets between rolls having different speeds to produce tangential stress on said sheets to orient the ferrite crystals in said sheets, forming a laminae stack of the desired thickness from a plurality of sheets having oriented ferrite crystals, cutting out raw bodies of desired shapes from said laminae stack, compacting said raw bodies in a heated die assembly to expel a major portion of the wax binder, prefiring the raw bodies to remove the remaining portion of the wax binder, and then sintering the raw bodies at an elevated temperature to form a finished oriented hard ferrite body.

2. The method set forth in claim 1 wherein said die assembly is heated to a temperature above the melting temperature of the wax binder.

3. The method set forth in claim 1 wherein said raw bodies are compacted at a pressure of 10,000 p.s.i.

4. The method set forth in claim 1 wherein said deformable wax binder contains an adhesive.

References Cited

UNITED STATES PATENTS

| | | | |
|---|---|---|---|
| 2,122,960 | 7/1938 | Schwartzwalder | 264—266 X |
| 2,870,031 | 1/1959 | Benziger. | |
| 3,110,675 | 11/1963 | Brailowsky | 264—67 X |

FOREIGN PATENTS

| | | |
|---|---|---|
| 167,657 | 5/1956 | Australia. |

OTHER REFERENCES

J. B. Fracis: Fabricating a 3.5-Inch Ferrite Sphere, Ceramic Engineering, vol. 42, No. 5 (1963), p. 321.

ROBERT F. WHITE, *Primary Examiner.*

K. J. HOVET, *Assistant Examiner.*

U.S. Cl. X.R.

264—63, 67